(12) United States Patent
Lutz et al.

(10) Patent No.: US 12,168,998 B1
(45) Date of Patent: Dec. 17, 2024

(54) SERRATION CONNECTION FOR A STEERING ASSEMBLY

(71) Applicant: Volvo Truck Corporation, Gothenburg (SE)

(72) Inventors: Damien Lutz, Caluire et Cuire (FR); Arianna Shadfar, Prades-le-Lez (FR)

(73) Assignee: Volvo Truck Corporation, Gothenburg (SE)

( * ) Notice: Subject to any disclaimer, the term of this patent is extended or adjusted under 35 U.S.C. 154(b) by 127 days.

(21) Appl. No.: 17/987,954

(22) Filed: Nov. 16, 2022

(30) Foreign Application Priority Data

Nov. 26, 2021 (EP) .................................... 21210855

(51) Int. Cl.
*F16C 3/02* (2006.01)
*B62D 1/16* (2006.01)

(52) U.S. Cl.
CPC ............... *F16C 3/023* (2013.01); *B62D 1/16* (2013.01); *F16C 2326/24* (2013.01)

(58) Field of Classification Search
CPC ......... B62D 1/16; B62D 1/10; F16C 2326/24; F16D 3/64
See application file for complete search history.

(56) References Cited

U.S. PATENT DOCUMENTS

| | | | | |
|---|---|---|---|---|
| 6,620,050 | B2 * | 9/2003 | Park | F16D 3/387 403/109.1 |
| 8,052,535 | B2 * | 11/2011 | Miyawaki | B62D 1/185 384/42 |
| 9,206,852 | B2 * | 12/2015 | Kaphengst | F16D 1/06 |
| 11,511,786 | B2 * | 11/2022 | Hammerbacher | B62D 1/16 |
| 2009/0145257 | A1 | 6/2009 | Miyawaki et al. | |
| 2009/0270185 | A1 | 10/2009 | Miyawaki | |
| 2017/0138408 | A1 * | 5/2017 | Ishizaki | F16D 3/06 |

FOREIGN PATENT DOCUMENTS

KR 20170037955 A 4/2017

OTHER PUBLICATIONS

Extended European Search Report for European Patent Application No. 21210855.9, mailed May 6, 2022, 9 pages.

* cited by examiner

*Primary Examiner* — Paul N Dickson
*Assistant Examiner* — Tiffany L Webb
(74) *Attorney, Agent, or Firm* — Withrow & Terranova, PLLC

(57) ABSTRACT

A steering assembly including a serration connection for an automotive vehicle comprising a steering wheel comprising at least one wheel bearing having at least one connection part presenting gear teeth and gear teeth gaps and a steering column comprising a column bearing having at least one connection part presenting gear teeth and gear teeth gaps; the respective gear teeth and gear teeth gaps of the wheel bearing and of the column bearing being intended to cooperate together to connect in transmission the steering wheel and the steering column; and wherein at least one tooth gap of the wheel bearing is at least partially filled with a removable filling material; the corresponding area of the column bearing, respectively, facing the at least partially filled tooth gap, comprises at least one recess, and such arrangement is the initial position of the wheel bearing.

8 Claims, 2 Drawing Sheets

SERRATION CONNECTION FOR A STEERING ASSEMBLY

RELATED APPLICATIONS

The present application claims priority to European Patent Application No. 21210855.9, filed on Nov. 26, 2021, and entitled "SERRATION CONNECTION FOR A STEERING ASSEMBLY," which is incorporated herein by reference in its entirety.

TECHNICAL FIELD

The invention relates to the serration connection of a steering assembly for an automotive vehicle, particularly a truck or the like. This invention also relates to the manufacturing method of producing the steering assembly of the present invention, a method for setting up the steering assembly according to the present invention, and an automotive vehicle equipped with such a system.

BACKGROUND

In the field of automotive vehicles, reliable trajectory control is among the prominent safety features required for ensuring smooth and secure traffic on roads. The steering assembly is the part of the vehicle which ensures the link between the steering wheel and the front wheels. Therefore, an important part of the manufacture of an automotive vehicle lies in the quality of the production of the components constituting the steering assembly, and another part lies in the assembly of these components, in particular in their orientations.

It is known that, during the manufacture of the steering assembly, errors can be done by the operator during the connection of the steering wheel with the steering column, which may result in a misalignment of the pieces of the steering assembly. Therefore, the operator must take a certain time in order to be sure to correctly assemble the two pieces, and despite the concentration of the operator, mistakes can happen during this step.

A shift of the steering assembly may occur in the course of a normal use of the vehicles. This shift causes a misalignment between the wheels and the steering wheel. To correct the misalignment, the operator usually acts on the adjustment devices located at the wheels or take down the whole vehicle, in order to solve the problem. In both cases, the procedures are inconvenient because they keep an operator busy for a long period of time. Furthermore, when there is a problem with the adjustment devices located at the wheels (for example due to rust, or a breaking) the only way to correct the misalignment is to take down the vehicle, which is a heavy and long procedure.

Therefore, there is a need to find a solution, allowing to improve both the mounting of the steering assembly and of the repair operations thereof.

Objectives of the Disclosure

In order to solve the problems cited above, the objective of the present invention is to provide a steering assembly and a method for manufacturing the steering assembly which at least enable to:
  reduce the time for manufacturing the steering assembly, and/or
  reduce the number of errors associated to the misalignment of the steering column and the steering wheel during the manufacturing process, and/or.
  improve the reparation process of the steering assembly.

SUMMARY

After many researches, the inventors have come to a steering assembly including a serration connection in order to solve the technical problems mentioned above.

In a first object of the invention, it is proposed a steering assembly including a serration connection for an automotive vehicle comprising:
  a steering wheel comprising at least one wheel bearing having at least one connection part presenting gear teeth and gear teeth gaps and
  a steering column comprising a column bearing having at least one connection part presenting gear teeth and gear teeth gaps;
the respective gear teeth and gear teeth gaps of the wheel bearing and of the column bearing being intended to cooperate together to connect in transmission the steering wheel and the steering column;
and
  wherein
  at least one tooth gap of the wheel bearing is at least partially filled with a removable filling material;
  the corresponding area of the column bearing, respectively, facing the at least partially filled tooth gap, comprises at least one recess, and such arrangement is the initial position of the wheel bearing.

Hence, only one position allows the operator to assemble the steering column and the steering wheel together. Therefore, these pieces can be quickly assembled with the right alignment. As a result, the time for manufacturing the steering assembly is reduced, and the accuracy of the alignment of the pieces is significantly improved.

As the filling material of the tooth gap of the wheel bearing can be removed, it is possible for the operator to simply correct a misalignment by:
  taking off the steering wheel,
  removing the filling material, and
  finally mounting the steering wheel by shifting it at least one notch according to the angle to be corrected.

Therefore, the operator has a very fast and convenient way of setting the angle of the steering assembly without requiring to act on the adjustments devices located at the wheels, or deconstructing the whole vehicle.

The steps of filling and removing the material from the tooth gap are very simple and fast. Therefore, these steps do not extend the construction time of the vehicle and thus they do not increase the cost of production of the vehicle.

In another aspect of the present invention, when the number of filled tooth gap is higher than one, the filled teeth gaps can be adjacent to each other.

In another aspect, the number of filled teeth gap can be of one or more.

The amount of filled teeth gaps can be comprised between 1% and 50% preferably between 2% and 30%, even more preferably between 6% and 20% of the total number of teeth gaps.

In another aspect, the bearing connection part may be an internal part of the wheel bearing.

In another aspect, the bearing connection part may be an external part of the column bearing.

In another aspect, the removable filling material may be a polymeric resin.

In another aspect, the polymeric resin may comprise one or more resin components selected from the group comprising a polyorganosiloxane, a polyimide, a styrene-based resin, a polyolefin-based resin, a polyoxyalkylene-based resin, a polyester-based resin, a polyvinyl chloride-based resin, a polycarbonate-based resin, a polyphenylene sulfide-based resin, a polyamide-based resin, an acrylate-based resin, an epoxy-based resin, and a fluorine-based resin.

In a specific embodiment of the present invention, the polymeric resin is a polyamide 6,6.

The removable filling material is selected such as it adheres to aluminum, magnesium and/or steel. The filling material is then sufficiently attached to the selected tooth gap so that the connection between the wheel bearing and the column bearing can be done efficiently at the right position. Furthermore, the filling material can be easily removed after the mounting process.

In another aspect, a steering wheel may be provided for a steering assembly according to the present invention.

In another aspect, a steering column which may include a column bearing for a steering assembly according to the present invention may be provided.

In another object of the present invention, a method for producing a steering assembly according to the present invention is proposed which may comprises the steps of:
 a) implementing a steering wheel and a steering column according to the present invention;
 b) preparing a liquid precursor composition of a hardened filling material;
 c) filling at least one tooth gap of the wheel bearing with the liquid precursor composition of step b);
 d) hardening the liquid precursor composition filled in the tooth gap;
 e) inserting into each other the wheel bearing and the column bearing such that the recess faces the tooth gap filled with the hardened filling material.

In another aspect of the method of the present invention, when the number of filled tooth gap is higher than one, the filled teeth gaps can be adjacent to each other.

In another aspect of the method of the present invention, a cleaning step can be realized before the step a). This cleaning step allows to remove the impurities present on the surface of the wheel bearing or the column bearing and thus improves the adhesion of the removable filling resin.

Another object of the present invention lies in an alignment method for setting up a steering system including the steering assembly according to the present invention; wherein
 (i) the wheel bearing and the column bearing may be disconnected by withdrawal from each other;
 (ii) the hardened filling material may be removed from the adjacent teeth gaps;
 (iii) the wheel bearing and the column bearing may be inserted into each other so as to shift by at least one step the teeth gaps from their initial position.

The steering assembly of the present invention allows thanks to the alignment method cited above, to simply correct a misalignment of the steering assembly. As a result, the said method renders possible, to correct a potential shift without having to operate on the adjustment devices for the wheels but simply on the steering wheel, which is more convenient, and takes fewer time. For example, in the case of the rusting (or the breaking) of the adjustment devices located at the wheels, it would be impossible for the operator to correct the misalignment with at this location of the car. Therefore, the operator would have to deconstruct the whole vehicle in order to reset the alignment of the steering assembly. Therefore, the method of the present invention improves the process to repair the steering assembly of the vehicle by giving an alternative allowing to simply reset the alignment of the steering assembly even if the adjustment devices located at the wheels are damaged without deconstructing the whole vehicle.

Another object of the present invention lies in a motorized vehicle in which the steering system comprises the steering assembly according to the present invention.

BRIEF DESCRIPTION OF THE DRAWINGS

Other features, details and advantages will be shown in the following detailed description and on the figures, on which.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. These embodiments are rather provided for thoroughness and completeness, and fully convey the scope of the disclosure to the skilled addressee. In the figures, the same references denote identical or similar elements. For sake of clarity, various elements may not be represented at scale.

Figure 1:
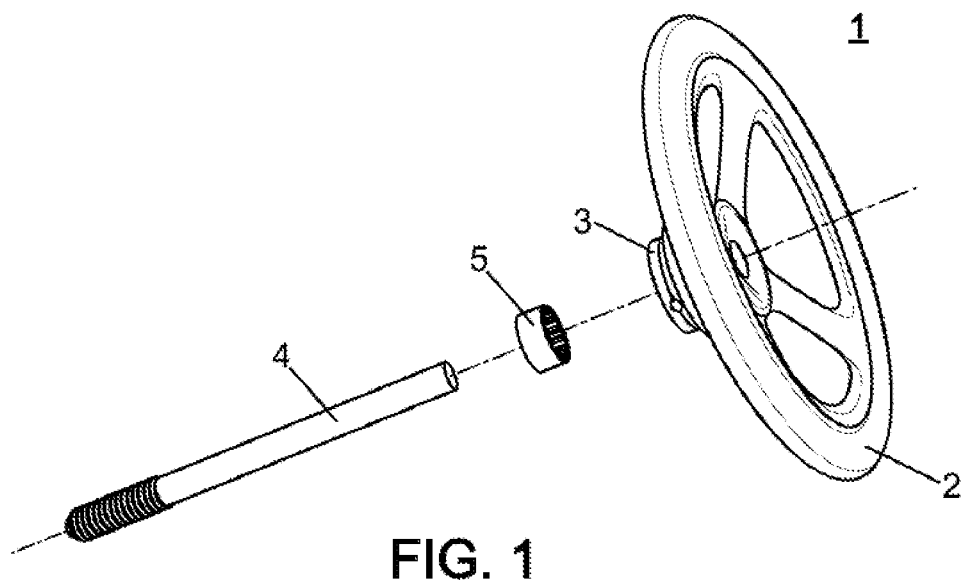
FIG. 1 is an exploded diagram of the column and the steering wheel of the steering assembly according to the present invention.

The spatial referential for the terms "upper" and "lower" used hereinafter used in reference to FIG. 1, is given by FIG. 1 wherein right end corresponds to the top and left end to the bottom.

FIG. 1 represents an exploded diagram of the steering assembly 1 according to the present invention. This steering assembly comprises two main pieces, namely a steering wheel 2 and a steering column 4 which are reversibly bound together through two complementary connecting elements. These latter are a wheel bearing 3 and a column bearing 5 which are respectively part of the lower region of the steering wheel 2 and part of the upper region of the steering column 4.

Figure 2:
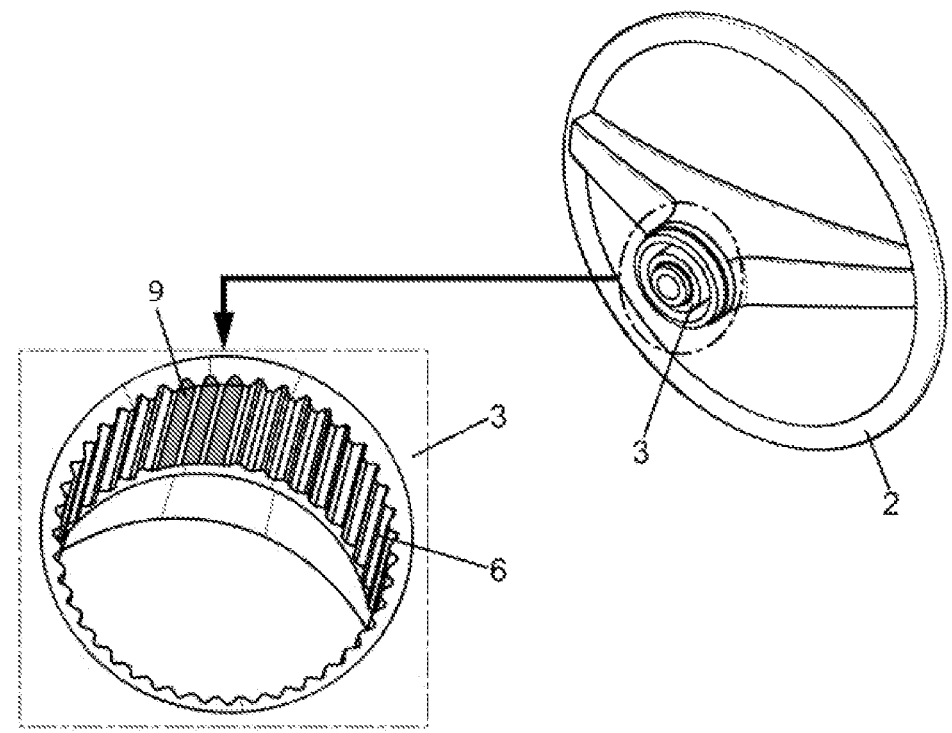
FIG. 2 comprises a perspective view (right side) of the wheel bearing according to an embodiment of the invention and a detailed perspective view (left side) of the wheel bearing (right).

FIG. 2 represents in its right part a perspective view of the steering wheel 2 including its wheel bearing 3 according to an embodiment of the invention, whereas the left part of FIG. 2 is a detailed perspective view of the wheel bearing 3 shown on the wheel 2 of the right part of FIG. 2. As shown on this detailed view, the wheel bearing 3 is an inner gear ring having teeth gaps 6. In the detailed perspective view of the wheel bearing 3, three teeth gaps 6 located at the upper region of the wheel bearing 3 are filled with the removable filling material 9.

Figure 3:
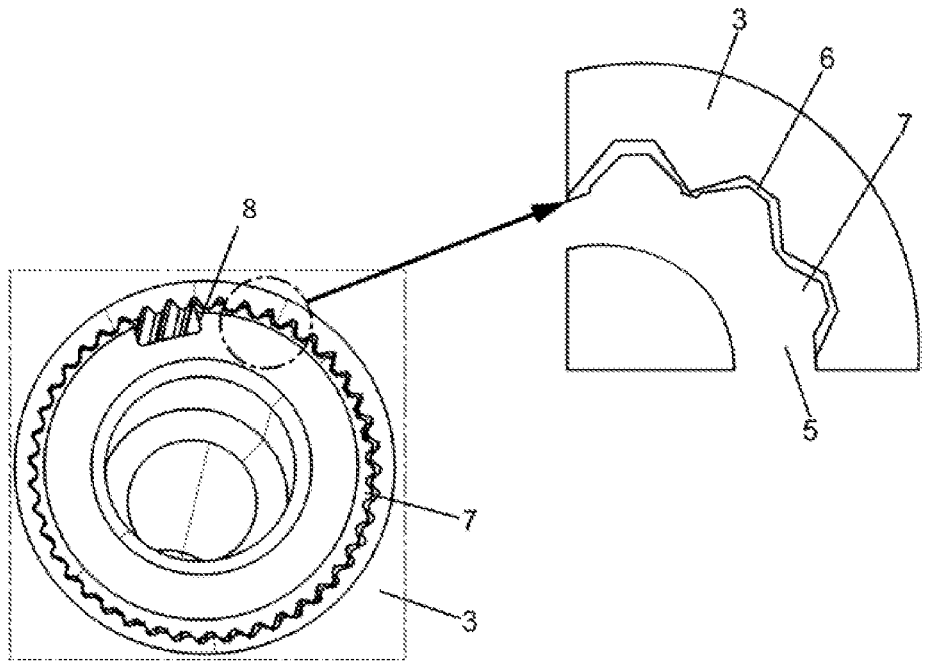
FIG. 3 comprises a perspective view of the wheel bearing and the column bearing according to an embodiment of the invention (left side), and a detailed front view of the connection between the teeth gaps of the wheel bearing and the gear teeth of the column bearing according to an embodiment of the invention (right side).
Figure 4:
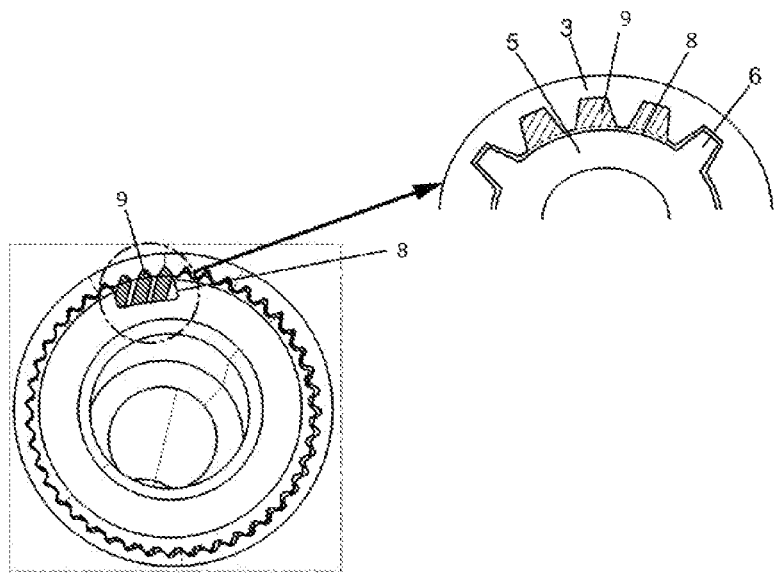
FIG. 4 comprises a perspective view of the wheel bearing and the column bearing according to an embodiment of the invention (left side), and a detailed front view of the filled teeth gaps of the wheel bearing and the recess of the column bearing according to an embodiment of the invention (right side).

As shown in FIGS. 3 and 4, the column bearing 5 is an outer gear hub presenting outwardly extended gear teeth 7 on its exterior face and designed such as each gear tooth 7, corresponds and has a complementary shape to a tooth gap 6 of the wheel bearing 3, to make it possible the wheel bearing 3 and the column bearing be in mesh. The column bearing 5 is also characterized in that it is provided with a recess 8 in place of outwardly extended gear teeth 7. This recess 8 faces the teeth gaps 6 of the wheel bearing 3, filled with the removable filling material 9.

Therefore, according to the specific structures of the wheel bearing 3 and the column bearing 5, only one angular position is possible to connect the column bearing 5 with the wheel bearing 3 as shown in FIG. 4.

Example of an implementation of the process for manufacturing the steering assembly according to the present invention.

Step a) implementing steering wheel 2 and steering column 4 as those above described in reference to FIGS. 1-4
b) preparing a liquid precursor composition of a hardened filling material
c) filling at least one tooth gap 6 of the wheel bearing 3 with the liquid precursor composition of step b);
d) hardening the liquid precursor composition filled in the teeth gaps 6;
e) inserting into each other the wheel bearing 3 and the column bearing 5 such that the recess 8) faces the teeth gaps 9 filled with the hardened filling material.

During the step b), the raw material used as a removable filling material is melted at a temperature corresponding to the fusion temperature of the removable filling material in order to obtain a liquid form of the removable filling material which is the liquid precursor composition. In this example, a polyamide having a viscosity number comprise between 100 to 150 cm$^3$/g (according to ISO 307, 1157, 1628) and a melting point comprise between 20° and 300° C. (according to ISO 11357-1/-3), is used as the raw material of the removable filling material and is melted at a temperature of between 200 to 300° C.

For example, the commercial product polyamide 6,6 Zytel® 103HSL BKB080 from Dupont has been used as the polyamide during the step b).

During the step c), in order to cast the liquid precursor composition in the specifically chosen three teeth gaps 6 of the wheel bearing 3 of this example, an appropriate jig hiding the not to be filled teeth gaps, is used and set up on the wheel bearing 3. The liquid precursor composition is poured and casted in the non-hidden teeth gaps 6 of the wheel bearing 3.

During the step d), the liquid precursor composition is then dried (for example by air) and after at least few seconds the jig is removed. The three teeth gaps 6 are filled with the hardened removable filling material 9, and the so-transformed wheel bearing 3 is the wheel bearing of the present invention.

The invention claimed is:

1. A steering assembly including a serration connection for an automotive vehicle comprising:
   a steering wheel comprising at least one wheel bearing having at least one connection part presenting gear teeth and gear teeth gaps; and
   a steering column comprising a column bearing having at least one connection part presenting gear teeth and gear teeth gaps;
   wherein the respective gear teeth and gear teeth gaps of the wheel bearing and of the column bearing are configured to cooperate together to connect in transmission the steering wheel and the steering column;
   wherein at least one tooth gap of the wheel bearing is at least partially filled with a removable filling material, the removable filling material adhering to the wheel bearing; and
   wherein a corresponding area of the column bearing facing the at least one partially filled tooth gap comprises at least one recess, and such arrangement is an initial position of the wheel bearing.

2. The steering assembly of claim 1, wherein when the number of filled tooth gaps is higher than one, the filled teeth gaps are adjacent to each other.

3. The steering assembly of claim 1, wherein the bearing connection part is an internal part of the wheel bearing.

4. The steering assembly of claim 1, wherein the bearing connection part is an external part of the column bearing.

5. The steering assembly of claim 1, wherein the removable filling material is a polymeric resin.

6. The steering assembly of claim 5, wherein the polymeric resin comprises one or more resin components selected from the group consisting of a polyorganosiloxane, a polyimide, a styrene-based resin, a polyolefin-based resin, a polyoxyalkylene-based resin, a polyester-based resin, a polyvinyl chloride-based resin, a polycarbonate-based resin, a polyphenylene sulfide-based resin, a polyamide-based resin, an acrylate-based resin, an epoxy-based resin, and a fluorine-based resin.

7. A method for producing the steering assembly of claim 1 comprising the steps of:
   implementing the steering wheel and the steering column;
   preparing a liquid precursor composition of the removable filling material;
   filling at least one tooth gap of the wheel bearing with the liquid precursor composition;
   hardening the liquid precursor composition filled in the at least one tooth gap; and
   inserting the wheel bearing and the column bearing into each other such that the recess faces the at least one tooth gap filled with the hardened filling material.

8. An alignment method for setting up a steering system including the steering assembly of claim 1, wherein the alignment method comprises the steps of:
   disconnecting the wheel bearing and the column bearing by withdrawal from each other;
   removing the removable filling material from the adjacent teeth gaps; and
   inserting the wheel bearing and the column bearing into each other so as to shift the wheel bearing and the column bearing from their initial position by at least one gap of the teeth gaps.

* * * * *